Feb. 19, 1935. J. J. SINDLER 1,991,871
EATING IMPLEMENT
Filed March 16, 1934
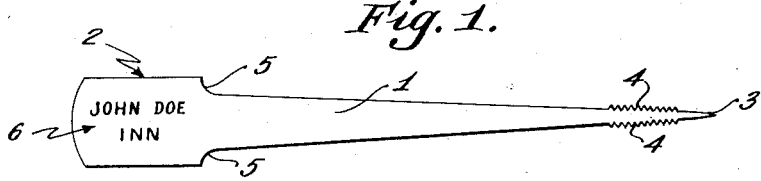
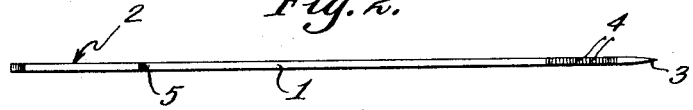
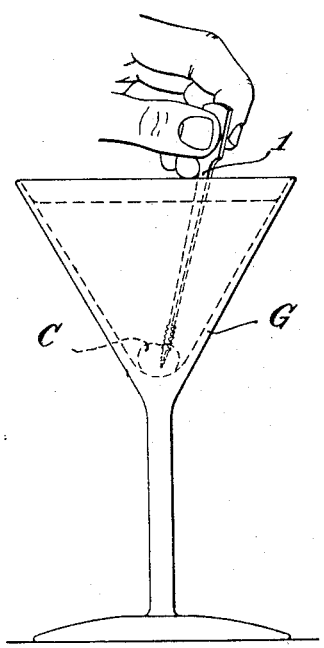
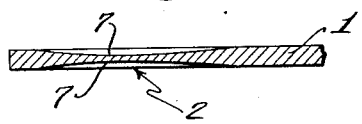
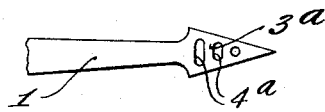
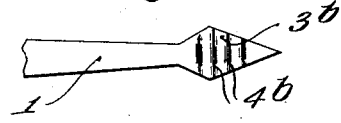
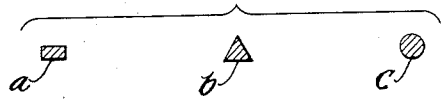
Inventor,
Jay J. Sindler,
by Roberts, Cushman & Woodbury.
Attys.

Patented Feb. 19, 1935

1,991,871

UNITED STATES PATENT OFFICE 1,991,871

EATING IMPLEMENT

Jay J. Sindler, Malden, Mass.

Application March 16, 1934, Serial No. 715,911

2 Claims. (Cl. 30—5)

This invention pertains to eating implements and relates more particularly to an implement useful for picking up and conveying to the mouth articles of food such, for example, as olives, cherries, etc. which are commonly used as garnishes for food or drinks and which by reason of their shape, or of the shape of the dish or glass in which the food or drink is served, are troublesome to pick up and carry to the mouth. As a specific example, the difficulty of securing a cherry resting at the bottom of a cocktail glass, without resorting to boorish antics obnoxious to people accustomed to polite social usages is so well known as to have become a matter of public comment and jest.

The principal object of the present invention is to provide an implement especially designed to facilitate the ready removal of a cherry or the like from the bottom of a deep glass or other container, although the implement, in a preferred embodiment, may have other utilities as well.

While the invention may, if desired, be embodied in metal, for example silver, for use as a permanent addition to the usual table service, I prefer to make it of some inexpensive material, for example, wood, compressed paper, celluloid, or the like, so that after one use it may be discarded. When thus made of wood or other cellulosic and/or cheap material, I contemplate so shaping the handle portion of the implement as to give it a secondary utility, for example, to provide a convenient surface for the reception of advertising matter or to serve as a paddle or spoon-like element which, upon reversal of the implement, may be used for eating ice cream or other soft foods.

In the accompanying drawing wherein I have illustrated one desirable embodiment of the invention by way of example Fig. 1 is a plan view of a preferred form of my improved implement;

Fig. 2 is an edge elevation of the implement;

Fig. 3 is a side elevation of a glass illustrating the mode of using the implement to remove a cherry or the like from the bottom of the glass;

Fig. 4 is a fragmentary plan view illustrating a modification of the handle portion of the implement;

Figs. 5 and 6 are fragmentary views illustrating modifications of the point of the implement; and Fig. 7 is a composite view illustrating typical transverse sections of the implement.

Referring to the drawing, the numeral 1 designates the elongate shaft or shank portion of the implement, preferably tapering slightly from one end to the other and merging at one end into the relatively broad handle portion 2. At its opposite end the shank merges into a point, preferably having a sharp tip 3, and having corrugations or teeth 4 at its opposite edges above or rearwardly of the tip, such teeth or corrugations forming barbs or retaining elements for securely holding a cherry which has been speared on the point. While these teeth are not always essential I prefer to employ them or equivalent elements, as it is obviously desirable to prevent the cherry from falling and staining the tablecloth or the user's apparel on its way from the glass to the mouth.

The implement thus described may conveniently be made from a piece of thin wood or, if preferred, from compressed paper fiber, celluloid, or other material,—usually such as may be obtained in sheet form of the desired thickness, and from which the implement may be made by a cutting or stamping process. If wood, paper or other fibrous cellulosic material be employed, it may be waterproofed in any usual manner, if desired, and obviously, the material, of whatever nature, may be stained or colored with a harmless and permanent stain or pigment if it be desired to do so. Preferably the tip 3 of the point of the implement tapers both in plan and elevation, as shown by reference to Figs. 1 and 2, although it is not essential that the point taper in more than one plane. The teeth or corrugations 4 which form the barbs may form the sides of simple, symmetrical indentations, or V-notches, or may be cut or otherwise formed so that they lean backward toward the handle in order better to retain a cherry which has been impaled on the point. I contemplate that the number of teeth or corrugations may be varied as desired, and that if preferred the point may be of the more or less triangular shape as illustrated at 3ª in Fig. 5, or of the substantially diamond shape illustrated at 3ᵇ in Fig. 6. In the latter instances instead of the teeth or corrugations on the edges, I may, if desired, slit the point as shown at 4ª or provide it with transverse ribs as shown at 4ᵇ to enhance the retaining action. However, whatever specific shape be employed it should be such that there will be no substantial danger that the point will be broken off in the cherry or in the mouth of the user.

The handle 2 is preferably substantially flat, that is its front and rear faces are substantially parallel and at the junction of the handle and shank fillets 5 are preferably provided. If the handle has flat surfaces, such surfaces may conveniently be employed for the reception of advertising matter, as illustrated at 6. Alternatively, one or both of the faces of the handle may be concaved or dished so as to facilitate gripping the handle between the thumb and finger of the user. By reversing the implement and seizing it by the shank 1, the broad handle portion 2 may be employed as a spoon or paddle for use in eating ice cream or the like, the concavity of the opposite faces (if they are so formed) accentuating the spoon-like characteristics of the device.

While I contemplate the use of sheet material in making my improved implement thus resulting in a typical transverse section, as shown at $a$ in Fig. 7, I may, if desired, make the implement in other ways; for example, the implement may have a triangular section, as indicated at $b$ in Fig. 7, or a circular section, as shown at $c$ in Fig. 7. In the latter case the implement may conveniently be made by turning or some similar process so that at substantially all transverse sections the implement is of circular contour.

When, as suggested, the implement is made of some cheap material such as wood, paper, or the like, it may be discarded after one use, thus avoiding the necesity of washing and is of special advantage if the implement be employed in eating garnishes or other food materials which have a strongly characteristic flavor or odor, for instance, bits of cheese, pickled fish, anchovies, etc.

The mode of using the device is illustrated in Fig. 3, the fingers of the user grasping the broad handle of the implement, thus affording a firm grip so that its point may be pushed into the cherry C resting at the bottom of the glass G.

Obviously if the device be made of silver or other metal, its contours may be made more dainty and delicate and its surfaces ornamented by an appropriate design, although the same essential features, to wit, the point, the shank and the handle will be preserved, and I contemplate that all modifications in material and in shape and proportion of parts, such as fall within the scope of the appended claims are to be regarded as a part of my invention.

I claim:

1. An implement of the class described adapted for use in eating the fruit or other solid comestible articles in cocktails and the like, said implement comprising a unitary, flat, sheet-like piece of organic material of substantially uniform thickness formed to have an elongated, narrow, flat shank portion terminating at one end in a widened flat handle portion and at the other end in a pointed portion adapted to impale said solid articles, said pointed portion being provided with integral, laterally disposed article engaging projections adapted to prevent accidental removal of said articles, said projections extending outwardly beyond the adjacent shank portion and lying in the plane thereof.

2. An implement of the class described adapted for use in eating the fruit or other solid comestible articles in cocktails and the like, said implement comprising a unitary, flat, sheet-like piece of non-metallic material, of substantially uniform thickness formed to have an elongated, narrow, flat shank portion terminating at one end in a widened flat handle portion and at the other end in a pointed portion adapted to impale said solid articles, said pointed portion being provided with integral, laterally disposed article engaging projections adapted to prevent accidental removal of said articles, said projections being formed by extending the two side edges of the pointed portion beyond the adjacent edges of the shank portion.

JAY J. SINDLER.